(12) United States Patent
Farahani et al.

(10) Patent No.: US 9,989,992 B2
(45) Date of Patent: Jun. 5, 2018

(54) LOGO FEATURES OF A PORTABLE COMPUTER

(71) Applicant: Apple Inc., Cupertino, CA (US)

(72) Inventors: Houtan R. Farahani, San Ramon, CA (US); Hsinhan Wu, San Jose, CA (US); Lindsay D. Corbet, San Jose, CA (US); Hilbert T. Kwan, San Jose, CA (US); Katherine Spriggs, Palo Alto, CA (US); You Fu Tan, Jiangsu (CN)

(73) Assignee: APPLE INC., Cupertino, CA (US)

( * ) Notice: Subject to any disclaimer, the term of this patent is extended or adjusted under 35 U.S.C. 154(b) by 50 days.

(21) Appl. No.: 14/832,976

(22) Filed: Aug. 21, 2015

(65) Prior Publication Data

US 2016/0209870 A1    Jul. 21, 2016

Related U.S. Application Data

(60) Provisional application No. 62/104,597, filed on Jan. 16, 2015.

(51) Int. Cl.
    *G09F 7/16*     (2006.01)
    *G06F 1/16*     (2006.01)

(52) U.S. Cl.
    CPC .............. *G06F 1/1613* (2013.01); *G09F 7/16* (2013.01)

(58) Field of Classification Search
    CPC .......... G06F 1/1613; B44C 1/222; B44C 1/26
    See application file for complete search history.

(56) References Cited

U.S. PATENT DOCUMENTS

| | | | | |
|---|---|---|---|---|
| 2,028,013 A | * | 1/1936 | Reilly | ........................ B44C 1/04 |
| | | | | 205/120 |
| 2,143,744 A | * | 1/1939 | Sohn | .......................... B44C 1/26 |
| | | | | 428/46 |
| 3,530,022 A | * | 9/1970 | Mallory | .................. B29C 33/32 |
| | | | | 156/245 |
| 5,660,668 A | * | 8/1997 | Matheson | .............. B23K 26/08 |
| | | | | 156/268 |
| 5,698,276 A | * | 12/1997 | Mirabitur | .............. B60R 13/005 |
| | | | | 156/242 |

(Continued)

*Primary Examiner* — Charles A Fox
*Assistant Examiner* — Christopher E Veraa
(74) *Attorney, Agent, or Firm* — Brownstein Hyatt Farber Schreck, LLP

(57) ABSTRACT

An enclosure for a portable computing device is disclosed. The enclosure includes an indicium (e.g., logo) positioned in an opening extending partially through the enclosure. The enclosure includes multiple material removal processes. First, a tool (e.g., laser ablation tool) can be used to ablate the opening defining an ablation having a shape or profile similar to that of the indicium. A second material removal process can remove a region within the ablation to define an indicium support. The second material removal process may be performed by a CNC cutting tool capable of forming the indicium support to a desired precision. As a result, when the indicium is secured with the indicium support, the indicium includes a desired flatness that prevents an undesired reflectivity. In order to ensure the indicium properly fits in the opening, a third material removal process may be performed to define an indention region around the opening.

20 Claims, 13 Drawing Sheets

(56) References Cited

U.S. PATENT DOCUMENTS

| | | | |
|---|---|---|---|
| 6,560,841 B1* | 5/2003 | Letherer | B44C 1/26 |
| | | | 29/428 |
| 7,491,437 B1* | 2/2009 | Corradino | B44C 1/26 |
| | | | 428/67 |
| 7,726,026 B1* | 6/2010 | Blume | F04B 53/102 |
| | | | 251/359 |
| 8,587,939 B2 | 11/2013 | McClure et al. | |
| 2008/0069656 A1* | 3/2008 | Volokh | B23C 3/02 |
| | | | 409/200 |
| 2009/0305003 A1* | 12/2009 | Nagashima | B44C 1/228 |
| | | | 428/195.1 |
| 2011/0052839 A1* | 3/2011 | Pierce | B60R 13/005 |
| | | | 428/31 |
| 2012/0124875 A1* | 5/2012 | Kitayama | B60R 13/005 |
| | | | 40/594 |
| 2013/0052376 A1 | 2/2013 | Ho et al. | |
| 2013/0077217 A1 | 3/2013 | Trzaskos et al. | |

\* cited by examiner

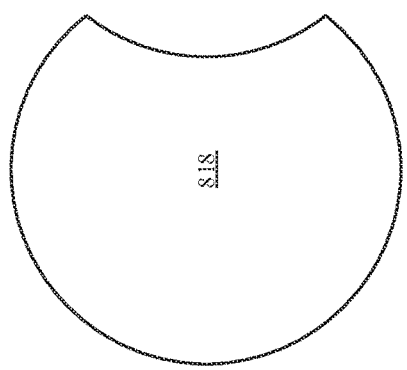
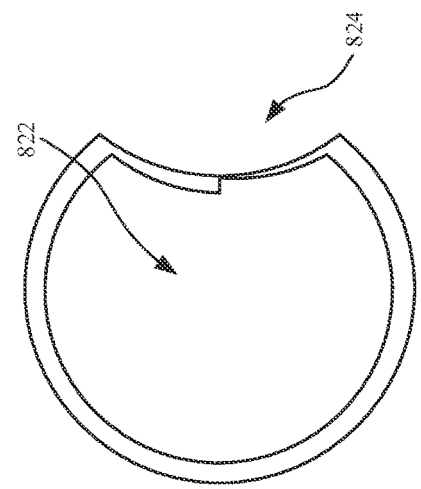
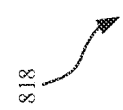
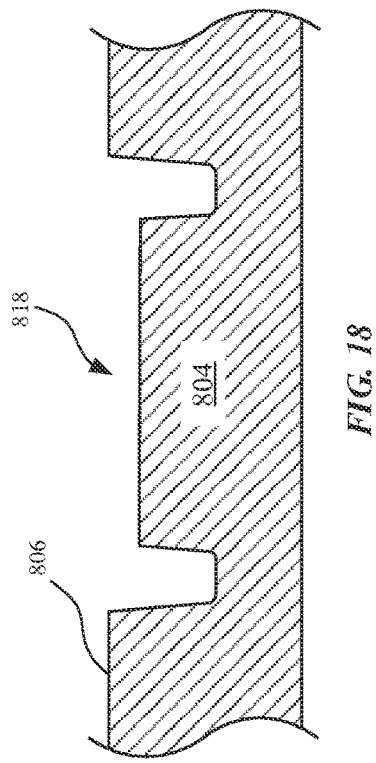

LOGO FEATURES OF A PORTABLE COMPUTER

CROSS-REFERENCE TO RELATED APPLICATION(S)

This application claims the benefit of priority under 35 U.S.C. § 119(e) to U.S. Provisional Application No. 62/104,597, filed on Jan. 16, 2015, the disclosure of which is incorporated herein by reference in its entirety.

FIELD

The described embodiments relate generally to a portable computing device. In particular, the present embodiments relate to securing an indicium to the portable computing device.

BACKGROUND

Portable computing devices often carry a logo or some other identifying feature secured to an exterior region (e.g., an enclosure) of the portable computing device. In some cases, the logo is formed from translucent material such that a light source within the portable computing device emits light that passes through the logo thereby illuminating the logo. However, the light source draws electrical current from an internal power supply (e.g., battery) of the portable computing device. In cases where the portable computing device is not electrically connected to an electrical outlet, the portable computing device may incur reduced operating times due to electrical current consumed by the light source.

SUMMARY

In one aspect, an enclosure of a portable computing device is described. The enclosure may include a substrate including an exterior region and an opening extending partially through the substrate to define a blind hole. The enclosure may further include an indicium support in the blind hole. In some cases, the indicium support is disposed at a first depth measured from the exterior region to a top surface of the indicium support. The enclosure may further include a relief section in the blind hole. In some cases, the relief section extends around the indicium support and is disposed at a second depth measured from the exterior region to a surface of the relief section. Also, the second depth may be greater than the first depth.

In another aspect, a method for forming an enclosure of a portable computing device is described. The method may include forming a blind hole that extends partially through the substrate and having a size and shape in accordance with the indicium. In some embodiments, the blind hole may be formed by removing a first amount of the substrate to a first depth and a second amount of the substrate to form a relief section to a second depth greater than the first depth. In some embodiments, a size and shape of the relief section defines an indicium support configured to receive the indicium.

In another aspect, a housing for carrying an operational component of a portable computing device is described. The housing may include an exterior region having a surface. The housing may further include a recessed portion that extends partially' through the housing. The recessed portion may include a terminus surface and a wall extending from the terminus surface and into a cavity defined by the recessed portion. The wall may define a size and shape of a support structure tier supporting an object. Also, the wall may further include an edge that defines a size and shape of a support surface of the support structure such that the support surface is approximately parallel to the surface of the exterior region.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which:

FIG. 18 illustrates a cross sectional view of an embodiment of a substrate having an indicium support having undergone an initial material removal process, in accordance with the described embodiments;

FIG. 19 illustrates plan view of the indicium support shown in FIG. 18 after the initial material removal process;

FIG. 20 illustrates a cross sectional view of the substrate shown in FIG. 18, with the indicium support undergoing a partial material removal process;

FIG. 21 illustrates plan view of the indicium support shown in FIG. 20;

Figure 1:
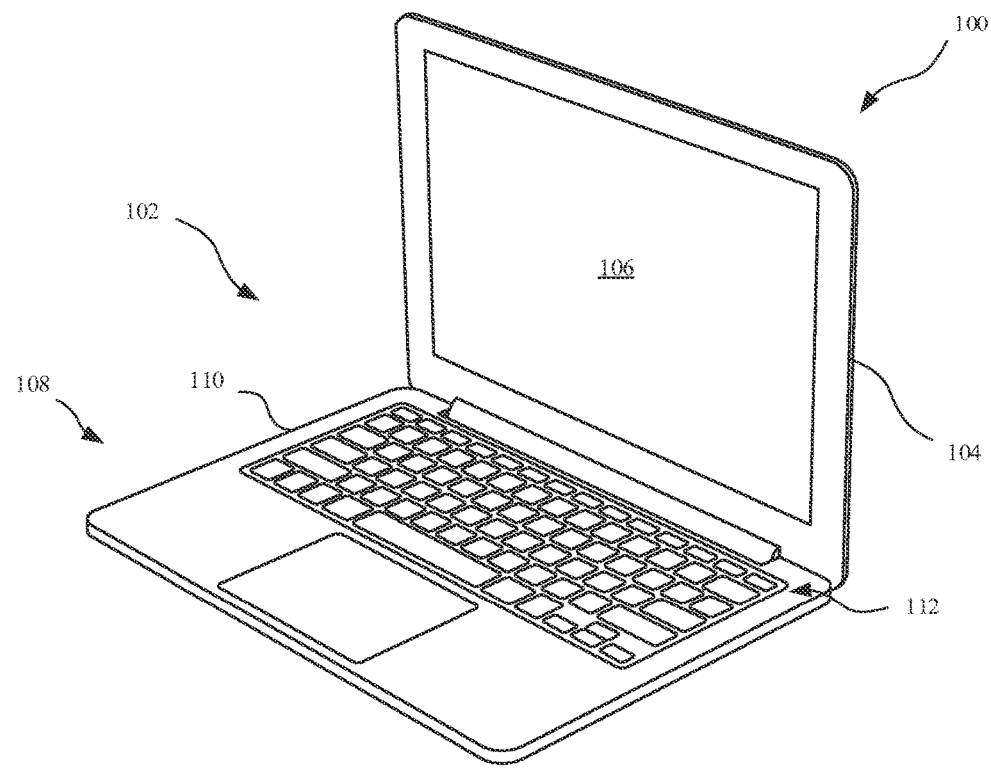
FIG. 1 illustrates an isometric view of an embodiment of a portable computing device in an open configuration.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to an enclosure of a portable computing device. In particular, the disclosure relates to manufacturing processes to a substrate (e.g., display housing that encloses a visual display) such that the substrate receives an indicium (e.g., logo) in a desired manner. Traditional portable computing devices may include an opening extending completely through the substrate, with an indicium positioned within the opening. The indicium may be formed from a translucent material (e.g., plastic) allowing a light source of the portable computing device to illuminate the indicium.

However, the following disclosure relates to portable computing devices that include a substrate (e.g., display housing) having an indicium, some of which are not illuminated by the portable computing device. This may be due in part to several reasons. For instance, the light source previously described may be removed in order to conserve battery power and/or to increase volume within the portable computing device. Also, the indicium may be positioned at least partially within a blind hole of the substrate. The phrase "blind hole" as used throughout this detailed description and in the claims refers to an opening or cavity that extends partially, but not completely, through a substrate. In this manner, a substrate may include a first region (or first surface) having a blind hole visible when viewing the first region. The substrate may also include a second region (or second surface) opposite the first region such that when viewing the second surface the blind hole is not visible.

The blind hole may include several features designed to enhance the position and appearance of the indicium. For instance, a material removal process may remove a portion of the substrate to include a size and a shape similar to that of the indicium. However, it will be appreciated that the material removal process may form a profile of the blind hole slightly larger (e.g., 1 millimeter or less in diameter) than that of the indicium such that the indicium may be positioned within the blind hole. A cutting tool or other material removal tool, such as a laser ablation tool, may be used to remove the material of the substrate. The cutting tool may remove additional material in order to define a relief section in the substrate. The relief section allows for some machining error, defect, or tolerance without altering the positioning of the indicium. The relief section may allow increased tolerances in a material removal operation, which may reduce manufacturing time and/or reduced waste as the substrate is less likely to be discarded due to the increased tolerances.

Within the blind hole, the substrate may undergo an additional material removal process. In some cases, an additional cutting tool (e.g., computer number control, or CNC, tool) may be used to remove an additional portion of the substrate to define an indicium support. The indicium support may be a base or platform used to receive and support an indicium defined as a logo, word, symbol, and/or letter. Modern cutting tools allow for high precision cutting such that the indicium support is relatively flat. For example, a substrate undergoing the described material removal process in mass production can nonetheless include an indicium support having a flatness measuring 15 micrometers. In other words, the variation from one edge of the indicium support to another edge of the indicium support may vary in elevation or topography by 15 micrometers or less. In this manner, an indicium secured with the indicium support also appears relatively flat.

Other material removal features may be performed on the substrate. For instance, an additional material removal process may define indention region disposed around the indicium support and the blind hole. The indention region can be designed to open to the blind hole and allow for some variance in the size and shape of the indicium. In this manner, an outer region (e.g., tapered region) of the blind hole does not unnecessarily engage or interfere with the positioning of the indicium. Also, the relief section and/or the indention region may be darkened by, for example, laser darkening or adding ink. In this manner, when the indicium is secured with the indicium support, a gap between the blind hole and the indicium allows only minimal, if any, visibility behind the indicium.

These and other embodiments are discussed below with reference to FIGS. 1-28. However, those skilled in the art will readily appreciate that the detailed description given herein with respect to these Figures is for explanatory purposes only and should not be construed as limiting.

FIG. 1 illustrates an isometric view of an embodiment of a portable computing device 100 in an open configuration. In some embodiments, the portable computing device 100 is a laptop computing device made by Apple, Inc., of Cupertino, Calif. As shown, the portable computing device 100 includes an enclosure 102 that includes a display housing 104 that receives a display panel 106 capable of displaying visual content. A lower portion 108 of the enclosure 102 may include a top case 110 coupled with a bottom case (not shown). The top case 10 includes several openings to receive a keyboard 112. The top case 110 and the bottom case may enclose several internal components (e.g., memory, processors, batteries, etc.). In some embodiments, the display housing 104, the top case 110, and the bottom case are formed from plastic. In the embodiment shown in FIG. 1, the display housing 104, the top case 110, and the bottom case are formed from a metal (e.g., aluminum, steel, stainless steel).

Figure 2:
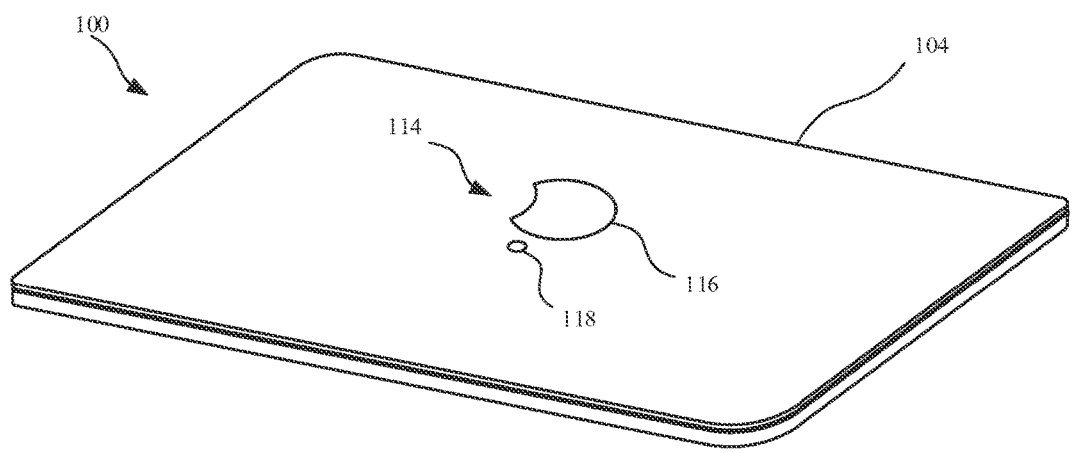
FIG. 2 illustrates an isometric view of the embodiment shown in FIG. 1, with the portable computing device in a closed configuration.

FIG. 2 illustrates an isometric view of the embodiment of the portable computing device 100 shown in FIG. 1, with the portable computing device 100 in a closed configuration. As shown, the display housing 104 may further include an indicium 114. In some embodiments, the indicium 114 is a letter, or multiple letters. In other embodiments, the indicium 114 is a symbol. In the embodiment shown in FIG. 2, the indicium 114 is a logo. In some instances, the logo represents a manufacturer of the portable computing device 100. Other shapes or features, including shapes having three or more sides, can be represented by the indicium 114. Also, in some embodiments, the indicium 114 is made from aluminum. In other embodiments, the indicium 114 is made from plastic. In the embodiment shown in FIG. 2, the indicium 114 is made from stainless steel. Also, in some embodiments, the indicium 114 may include a first indicium portion 116 and a second indicium portion 118 that define the indicium 114. However, in other embodiments, the indicium 114 is defined by a single structure.

Figure 3:
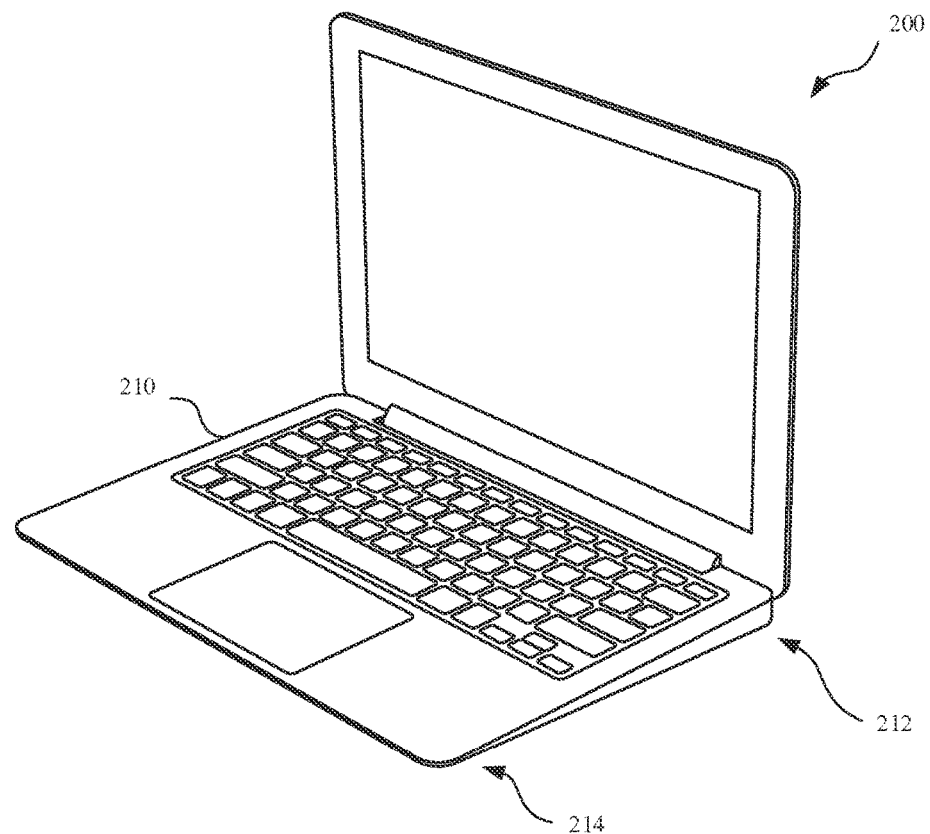
FIG. 3 illustrates an isometric view of an alternate embodiment of a portable computing device in an open configuration.
Figure 4:
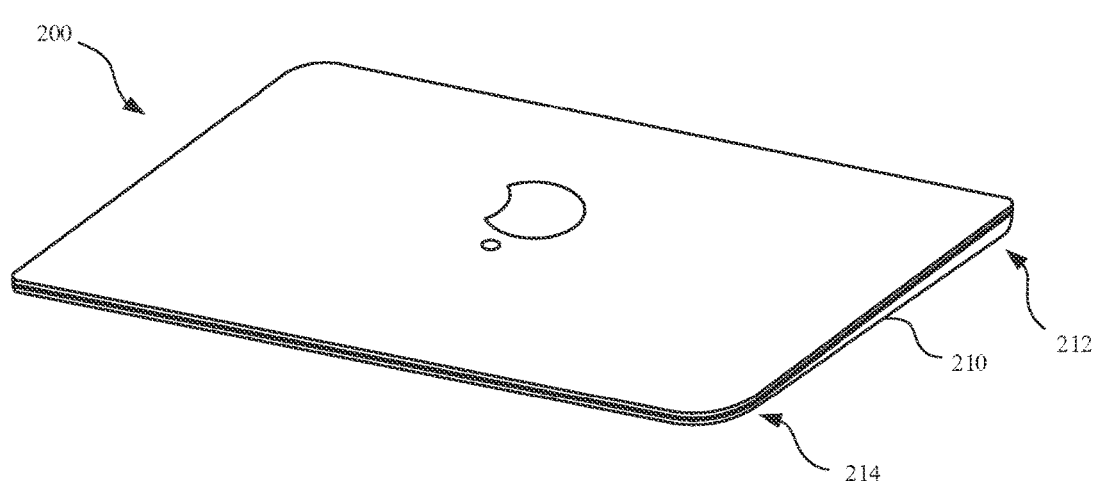
FIG. 4 illustrates an isometric view of the embodiment shown in FIG. 3, with the portable computing device in a closed configuration.

FIGS. 3 and 4 illustrate an isometric view of an alternate embodiment of a portable computing device 200 in an open and closed configuration, respectively. As shown, the portable computing device 200 includes a top case 210 that includes several features similar to those of the top case 110 shown in FIGS. 1 and 2. However, the top case 210 in FIGS. 3 and 4 includes a tapered region. In other words, the thickness of the top case varies from opposite ends of the top case 210. For example, the first region 212 of the top case 210 includes a first thickness and the second region 214 of the top case 210 includes a second region 214 having a second thickness less than the first thickness. Accordingly, FIGS. 3 and 4 illustrate the top case 210 tapering from the first region 212 to the second region 214. In this manner, the portable computing device 200 includes less volume and material which may correspond to a portable computing device having less weight than traditional portable computing devices.

Figure 5:
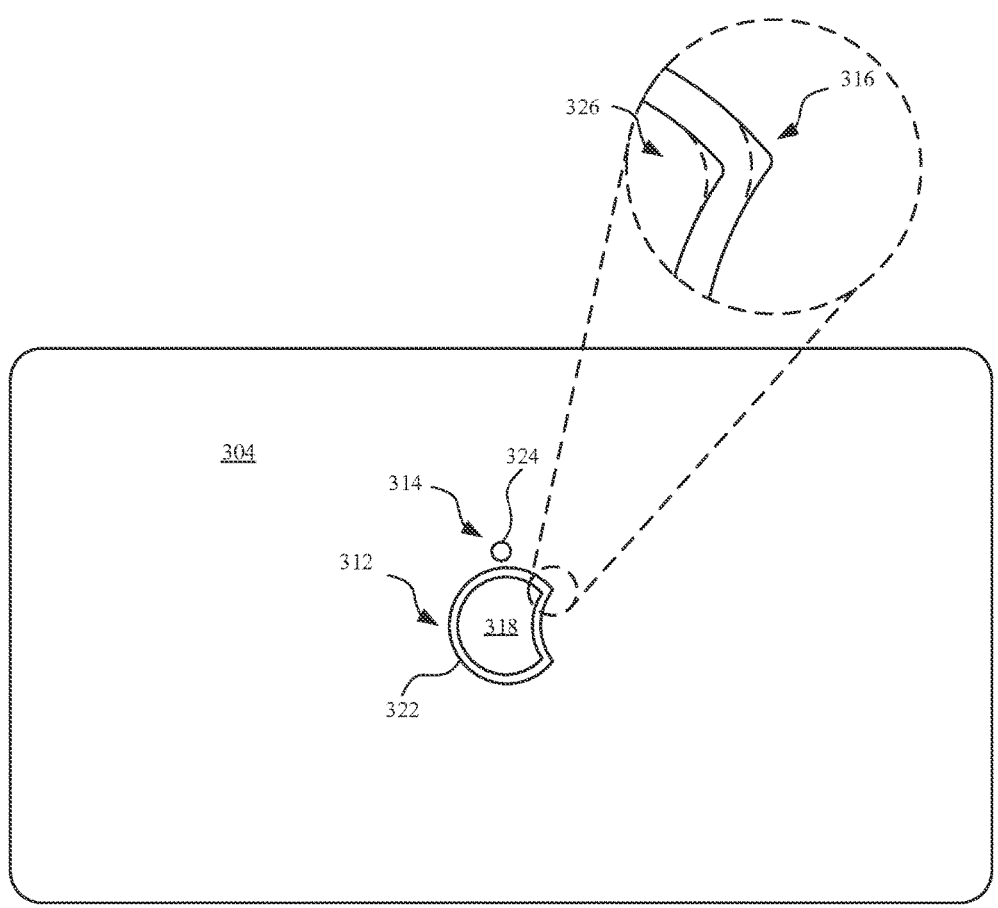
FIG. 5 illustrates a plan view of an embodiment of a display housing that includes several openings, in accordance with the described embodiments.

FIG. 5 illustrates a plan view of an embodiment of a display housing 304 that includes several openings, in accordance with the described embodiments. In some embodiments, the display housing 304 is formed from aluminum. As shown, the display housing 304 includes a first opening 312 and a second opening 314. The first opening 312 and the second opening 314 may combine to receive an indicium (such as the indicium 114 shown in FIG. 2). In some embodiments, the first opening 312 and the second opening 314 are formed from a cutting process. In the embodiment shown in FIG. 5, a profile 322 (i.e., a size and a shape) of the first opening 312 and a profile 324 of the second opening 314 are formed from laser ablation. Additional material removal processes may include other cutting tools, and will be discussed below. Using the laser ablation tool to form the profile includes several advantages. For instance, the enlarged view illustrates the first opening 312 having an edge feature 316. The laser ablation tool is capable of forming the edge feature 316 with a smaller radius, and accordingly, forming the first opening 312 in a desired manner which more closely resembles the shape of the indicium. For purposes of comparison, the dotted lines 326 in the enlarged view proximate to the edge feature 316 illustrate define an edge feature formed using a cutting tool other than the laser ablation tool. As shown, the edge feature defined by the dotted lines 326 includes a larger and more rounded radius than that of the edge feature 316. Accordingly, the edge feature 316, formed by a laser ablation tool, includes a sharper edge and more closely resembles a size and a shape of an indicium.

Although the indicium support 318 shown in FIG. 5 includes a size and a shape similar to that of an indicium, the first opening 312 may include an indicium support 318 that receives the indicium. The indicium support 318 may undergo a material removal process such that the indicium support 318 is sub-flush (i.e., below) with respect to an exterior region or surface of the display housing 304. In some embodiments, the indicium support 318 includes a shape similar to that of the indicium to be secured with the indicium support 318. Also, in some embodiments, the indicium support 318 includes a smaller surface area than that of the indicium. The smaller surface area of the indicium support 318 may require less precision machining to form the indicium support 318, which may lead to less manufacturing time. Also, due to the relatively small size and shape of the second opening 314, an indicium support is not required for a portion of the indicium positioned in the second opening 314, the laser ablation process used to form the second opening 314 is sufficient to receive a portion of the indicium and other cutting or ablating techniques may not be required.

Figure 6:
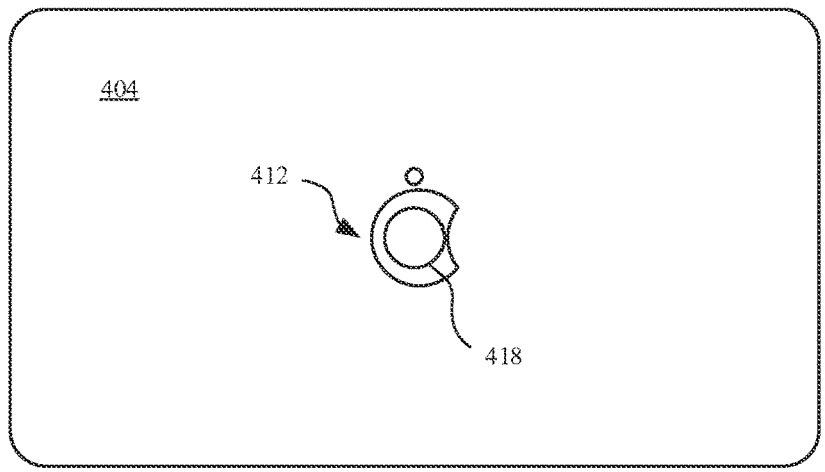
FIG. 6 illustrates a plan view of an alternate embodiment of a display housing that includes a first opening having an indicium support defined by a round feature.
Figure 7:
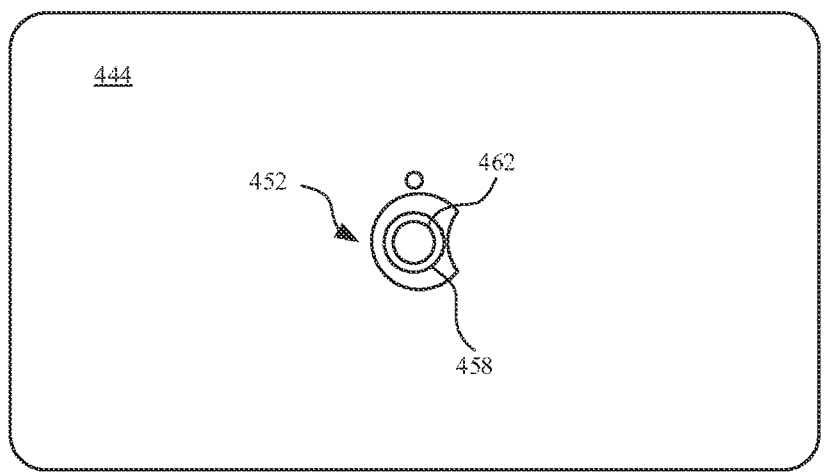
FIG. 7 illustrates a plan view of an alternate embodiment of a display housing that includes a first opening having an indicium support defined by a ring feature.
Figure 8:
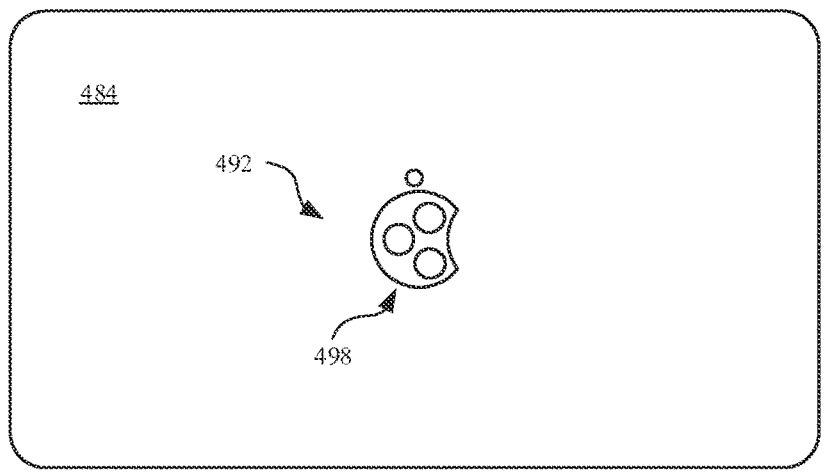
FIG. 8 illustrates a plan view of an alternate embodiment of a display housing that includes a first opening having an indicium support defined by several round features.

The indicium support used to secure the indicium with the display housing may be formed with other shapes and sizes. For example, FIG. 6 illustrates a plan view of an alternate embodiment of a display housing 404 that includes a first opening 412 having an indicium support 418 defined by a round feature. The indicium support 418 may require even less material removal than that of the indicium support 318 (shown in FIG. 5). FIG. 7 illustrates a plan view of an alternate embodiment of a display housing 444 that includes a first opening 452 having an indicium support 458 defined by a ring feature that includes a reduces support structure or support surface. Accordingly, a region 462 internal with respect to the indicium support 458 is also sub-flush with respect to the indicium support 458. This allows for an indicium support 458 with an even smaller surface area which requires less material removal. FIG. 8 illustrates a plan view of an alternate embodiment of a display housing 484 that includes a first opening 492 having an indicium support 498 defined by several round features disposed within the first opening 492. Although the features are shown as rounded, in other embodiments, the indicium support 498 includes several features that may include three or more sides to each feature.

A substrate used as part of an enclosure may include several features designed to an enhance not only the appearance of the substrate but also enhance the disposal of a feature, such as an indicium (not shown), on or in the substrate. The features may provide for a consistent, repeatable process desirable in mass production of portable computing devices. The following embodiment in FIGS. 9 and 10 describe relationships among several features of a substrate 604 suitable for use with a portable electronic device. For purposes of simplicity, only a portion of the substrate 604 is shown. However, the size and shape of the substrate 604 may be similar to, for example, the display housing 104 or the top case 110 shown in FIG. 1. In this manner, the substrate 604 may be designed to carry one or more operational components, such as a display panel 106 (shown in FIG. 1).

Figure 9:
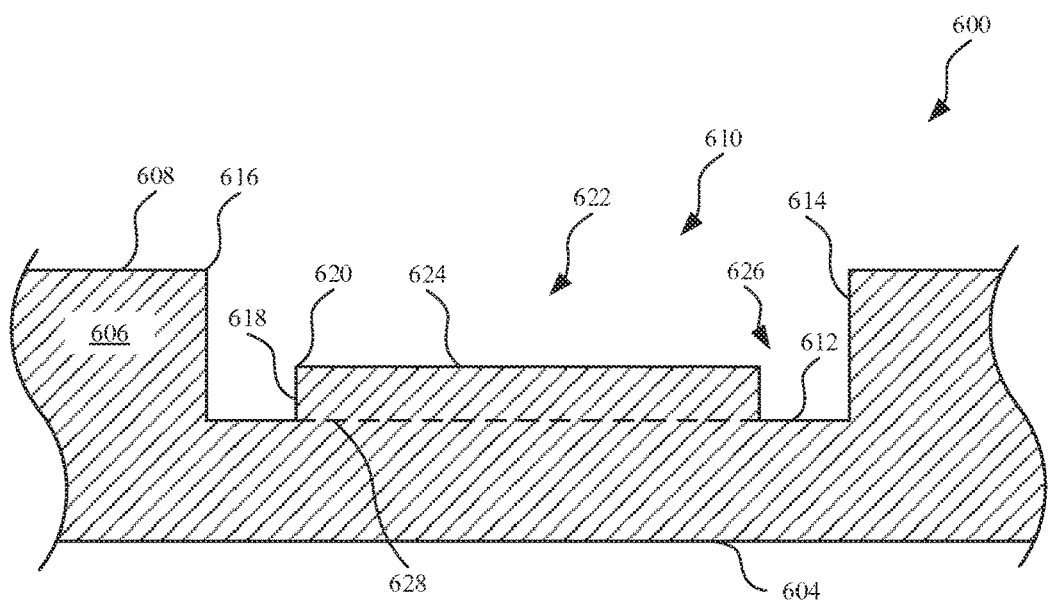
FIG. 9 illustrates a cross sectional view of a substrate, in accordance with the described embodiments.

FIG. 9 illustrates a cross sectional view 600 of a portion of a housing in the form of substrate 604, the housing used to carry an operational component of a portable electronic device in accordance with the described embodiments. As shown, the substrate 604 may include an exterior region 606 having a surface 608 associated with a cosmetic appearance of the housing viewable by a user of the portable electronic device. Moreover, during manufacturing, the substrate 604 may undergo material removal by way of a machining operation using, for example, a cutting tool or a laser ablation tool to define a recessed portion 610. In the described embodiment, the recessed portion 610 extends only partially through the substrate 604 and as such may also be referred to as a blind hole. Also, the exterior region 606 and the surface 608 extend circumferentially around the recessed portion 610.

The recessed portion 610 can include a bottom portion referred to as a terminus region having a terminus surface 612 and a wall 614 that extends from the terminus surface 612 having an edge 616 that defines a boundary between the surface 608 and the recessed portion 610. In some embodiments, a wall 618 extending into the recessed portion 610 from the terminus surface 612 has an edge 620 that together define a support structure 622 having a support surface 624 used to support an object. The support surface 624 may be designed to support an indicium or other object. It should be noted that the support structure 622 can be integrally formed with substrate 604 using the same or a similar machining operation that formed the recessed portion 610 subsequently followed by planarization of the support surface 624. The support structure 622 can also be formed subsequent to the formation of the recessed portion 610. For example, the support structure 622 can be formed using an additive manufacturing process (such as depositing metal using a solid state deposition process above over an imaginary line 628 extending along the terminus surface 612 followed by a machining operation to define the support structure 622). The support structure 622 can also be pre-formed and attached or otherwise secured to the terminus surface 612. In any case, the planarity of the support surface 624 can be such that the support surface 624 is generally parallel with respect to the surface 608 of the exterior region 606. In this way, the support structure 622 is able to receive and support a generally flat object in such a way that a viewable surface of the object is also generally parallel with respect to the surface 608. Further, a thickness of the object and that of the support structure 622 may combine to render the visible surface of the object (when secured with and supported by the support structure 622), co-planar with respect to the surface 608.

It should be noted that since the support structure 622 extends into the recessed portion 610, the terminus surface 612 can cooperate with the wall 614 and the wall 618 to define a relief section 626 that assures that an outer surface of an object (such as an indicium) secured to the support structure 622 at the support surface 624 is co-planar with the surface 608. In this way, a relief section 626 can allow a lateral dimension of the object to be larger than that of the support structure 622 and therefore can overhang, or extend beyond the edge 620. In the described embodiment, the relief section 626 can be formed using the machining operation used to form the recessed portion 610 and as a result of forming the support structure 622, or can be formed or otherwise modified subsequent to the formation of the support structure 622. The relief section 626 can be formed in such a way as to partially surround the support structure 622 or to fully surround support structure 622.

Figure 10:
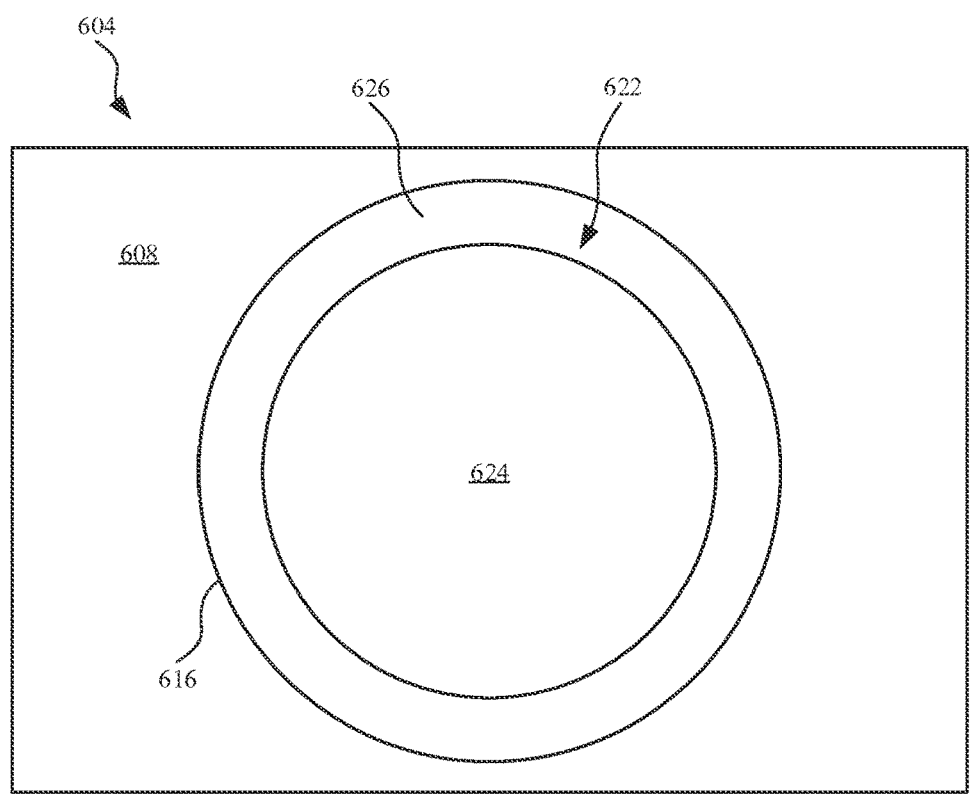
FIG. 10 illustrates plan view of the embodiment of the substrate shown in FIG. 9.

FIG. 10 illustrates plan view of the embodiment of the substrate 604 shown in FIG. 9. In some embodiments, the support surface 624 of the support structure 622 is defined by one or more edges features similar to, for example, the edge feature 316 (shown in FIG. 5). In the embodiment shown in FIG. 10, the support structure 622 and the support surface 624 takes on a circular shape. It should be noted, however, that the support structure 622 and support surface 624 may take on various shapes and sizes. It should be further noted, that the edge 616 can define a shape substantially similar to that of an indicium or indicium disposed on and secured at the support surface 624. Also, a single cutting and/or ablating operation of the recessed portion 610 (shown in FIG. 9) may simultaneously form the edge 616 and the edge 620. For example, a laser ablation tool that removes material from the substrate 604 can form both the edge 616 and the edge 620 such that the edge 616 and the edge 620 are parallel to each other, as shown in FIG. 10. Also, in some cases, the relief section 626 may also be co-formed with the edge 616 and the edge 620.

Figure 11:
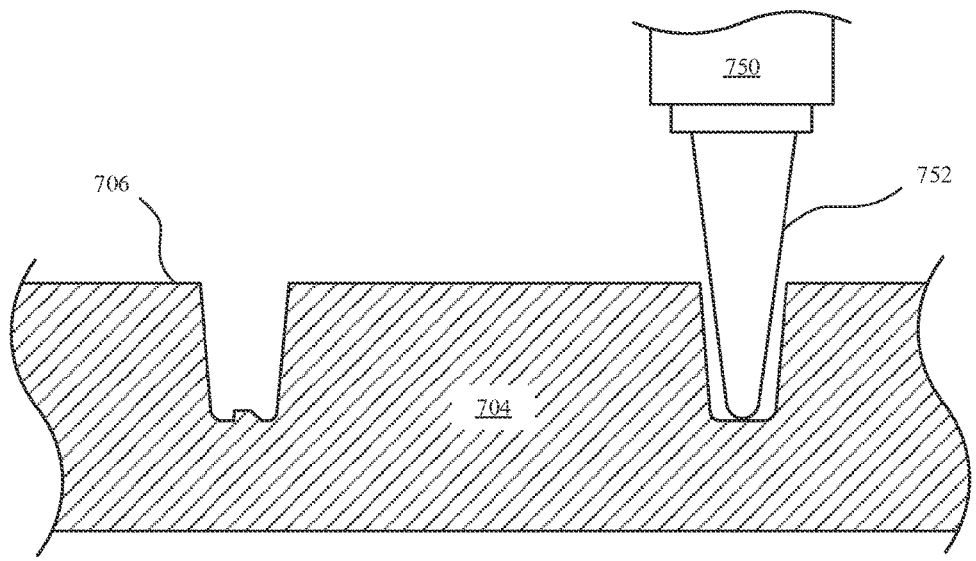
FIG. 11 illustrates a cross sectional view of an embodiment of a substrate undergoing a material removal process.

FIG. 11 illustrates a cross sectional view of an embodiment of a substrate 704 undergoing a material removal process. In some embodiments, the substrate 704 is a display housing of a portable computing device, such as the display housing 304 shown in FIG. 5. A cutting tool 750 used to remove material from the substrate 704. In some embodiments, the cutting tool 750 is a laser ablation tool that uses a laser beam 752. The cutting tool 750 removes a portion of the substrate 704 to define a profile having a size and a shape similar that of an indicium (such as a first indicium portion 116, shown in FIG. 2). In other words, the cutting tool 750 traces a desired shape around along an exterior region 706 of the substrate 704.

Figure 12:
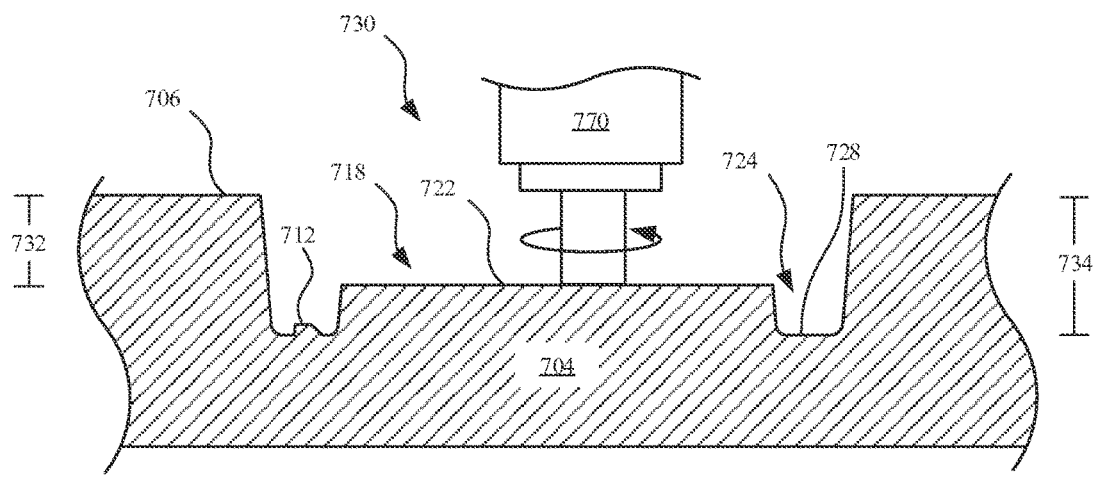
FIG. 12 illustrates a cross sectional view of the substrate shown in FIG. 11, with the substrate undergoing an additional material removal process.

FIG. 12 illustrates a cross sectional view of the substrate 704 shown in FIG. 11, with the substrate 704 undergoing an additional material removal process. As shown, a second cutting tool 770 is used to remove an additional portion of the substrate 704 to define an indicium support 718. In some embodiments, the second cutting tool 770 is a rotary tool, such as a CNC cutting tool. The indicium support 718 can be used as a platform that receives an indicium (not shown). The indicium support 718 may be sub-flush with respect to the exterior region 706. Further, the indicium support 718 is sub-flush to a first depth 732 measured from the exterior region 706 to a top surface 722 of the indicium support 718. Generally, the first depth 732 is defined by a dimension approximately similar to a thickness of the indicium and a thickness of the securing means (e.g., adhesive, solder, weld) between the indicium and the indicium support 718. In this manner, the indicium, when installed with the securing means, may be co-planar with respect to the exterior region 706 of the substrate 704. In some embodiments, the first depth 732 is less than 1 millimeter. Further, in some embodiments, the first depth 732 is less than 0.5 millimeters.

The material removed by using the cutting tool 750 and the second cutting tool 770 define a blind hole 730 extending partially through the substrate 704. Generally, when an indicium is not positioned within the substrate 704, the blind hole 730 is visible only when viewing the exterior region 706.

Also, at least some of removed material from the cutting tool 750 (in FIG. 9) is sub-flush with respect to the indicium support 718. This area is defined as a relief section 724 that extends around the indicium support 718. The relief section 724 is located at a second depth 734 greater than the first depth 732. The second depth 734 is measured from the exterior region 706 to a surface 728 of the relief section 724. In some cases, the cutting tool 750 may not remove all of the desired material, and a protrusion 712 may remain. However, because the cutting tool 750 removes material of the substrate 704 to the second depth 734, an indicium positioned on the indicium support 718 is not disturbed by the protrusion. Thus, the relief section 724 provides a clearance to an indicium as the relief section 724 may accommodate defects, such as the protrusion 712, which reduces the required precision of the cutting tool 750 which may lead to reduced manufacturing times.

The laser ablation technique offers further advantages. For example, by removing material from the substrate 704 with a laser cutting tool, the laser cutting tool defines a surface area of the indicium support 718 that is less than that of the indicium. The reduced surface area of the indicium support 718 offers a smaller surface area for the second cutting tool 770 to cut, which may improve the control of the second cutting tool 770. In other words, the cutting accuracy of the second cutting tool 770 may increases with less surface area to be cut by the second cutting tool 770.

Figure 13:
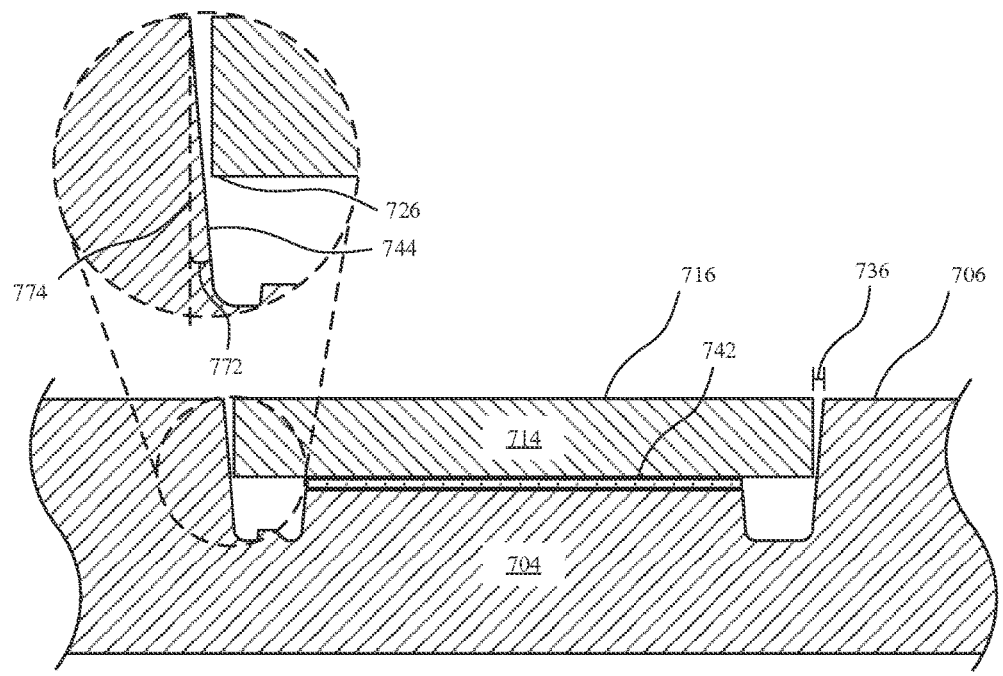
FIG. 13 illustrates a cross sectional view of the substrate shown in FIG. 12, with an in indicium secured with the indicium support.

FIG. 13 illustrates a cross sectional view of the substrate 704 shown in FIG. 12, with an in indicium 714 secured with the indicium support 718. The indicium 714 may be secured with the indicium support 718 via an adhesive layer 742. In some embodiments, the adhesive layer 742 is a pressure sensitive adhesive ("PSA"). However, other securing means may be used in other embodiments, which may include any adhesive generally known in the art for securing together two or more metallic structures. While the adhesive layer 742 shown in FIG. 11 is positioned between the indicium 714 and the indicium support 718, in other embodiments, the void or space between the indicium 714 and the blind hole of the substrate 704 is filled with an adhesive. For example, in some embodiments, the relief section 724 (shown in FIG. 10) is filled with an adhesive.

Also, the exterior region 706 of the substrate 704 may be separated from an exterior region 716 of the indicium 714 by a distance defined by a gap 736. It will be appreciated that the gap 736 extends around the outer perimeter of the exterior region 716. In some embodiments, the gap 736 is 1 millimeter or less. Further, in some embodiments, the gap 736 is approximately 0.1 millimeters.

As shown in the enlarged view, the profile formed via the cutting tool 750 (shown in FIG. 11) forms a tapered region 744. This is due in part to the laser beam 752 (also shown in FIG. 11) having a tapered, non-vertical region. The tapered region 744 may be inclined at an angle 772 with respect to an imaginary vertical line 774 extending from the exterior region 706 of the substrate 704. The angle 772 is approximately in the range of 5 to 15 degrees. The indicium 714 selected may be formed within a specified tolerance. Accordingly, in some cases, an interior region 726 of the indicium 714 may contact the tapered region 744. As a result, the positioning of the indicium 714 is altered in an undesired manner.

Figure 14:
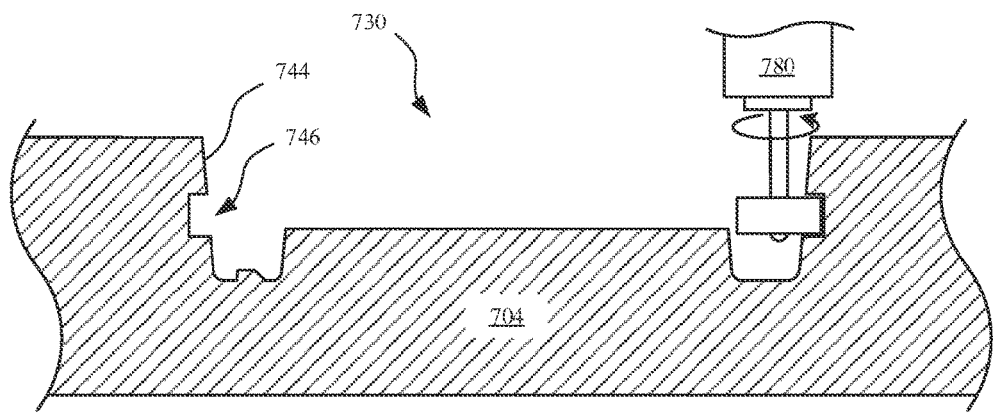
FIG. 14 illustrates a cross sectional view of the substrate shown in FIG. 12, with the substrate undergoing an additional material removal process.

FIG. 14 illustrates a cross sectional view of the substrate 704 shown in FIG. 12, with the substrate 704 undergoing an additional material removal process. For purposes of illustration, the indicium 714 and adhesive layer 742 shown in FIG. 13 have been removed. In order to provide additional clearance for an indicium, a third cutting tool 780 may be used to remove additional material from the substrate 704. In some embodiments, the third cutting tool 780 a rotary tool, such as a T-cutting tool. The material removal process performed by the third cutting tool 780 defines an indention region 746 in the substrate 704. As shown, the indention region 746 extends around the blind hole 730 and opening to the blind hole 730. The indention region 746 ensures an indicium will not be disturbed, or contacted, by the tapered region 744 of the substrate 704.

Figure 15:
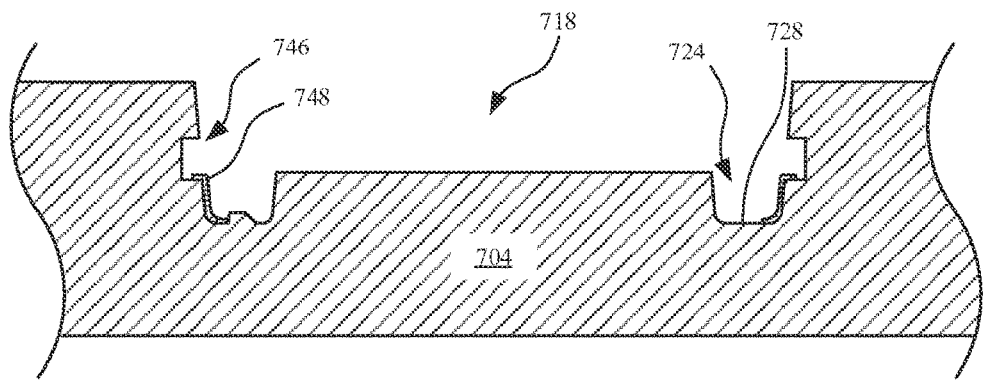
FIG. 15 illustrates a cross sectional view of the substrate shown in FIG. 14, with the relief section having a darkened region.

FIG. 15 illustrates a cross sectional view of the substrate 704 shown in FIG. 14, with the relief section 724 having a darkened region 748. Several means may be used to form the darkened region 748. For example, in some embodiments, the darkened region 748 is formed from a laser tool (not shown) that burns or chars a surface 728 of the relief section 724. In other embodiments, the darkened region 748 is formed by applying an ink, which may be brushed or printed onto the surface 728. Still, in other embodiments, the darkened region 748 is formed by applying a paint to the surface 728. Also, as shown, the darkened region 748 may extend at least partially into the indention region 746. Generally, the darkened region 748 includes a color or appearance darker than a color or appearance of the substrate 704 (which may be a color, such as gray). The darkened region 748 is intended to at least partially disguise any surface (e.g., surface 728 of the relief section 724) below the indicium (when assembled). Also, similar to the relief section 724, the darkened region 748 may extend around the indicium support 718.

Figure 16:
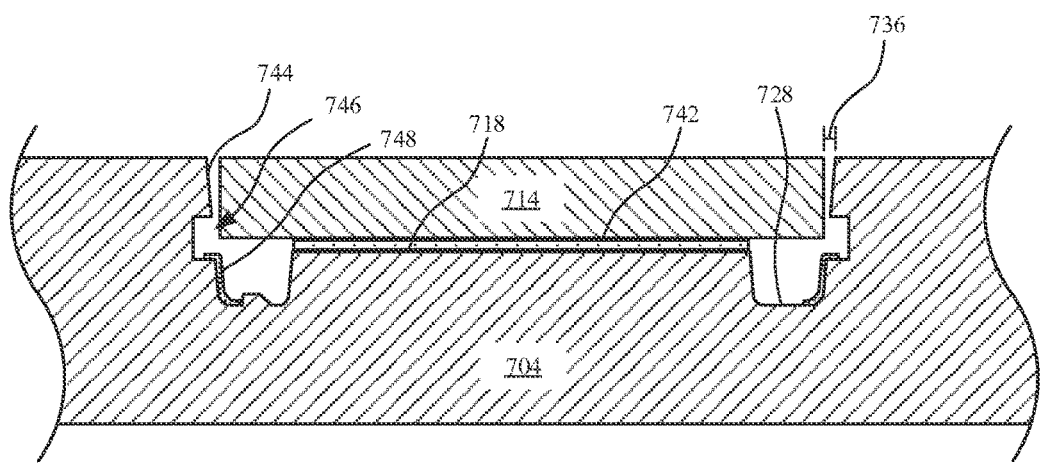
FIG. 16 illustrates a cross sectional view of the substrate shown in FIG. 15, with an in indicium secured with the indicium support.

FIG. 16 illustrates a cross sectional view of the substrate shown in FIG. 15, with an in indicium 714 secured with the indicium support 718, in a location defined by the blind hole 730 (shown in FIG. 14). As shown, the indicium 714 is secured with the indicium support 718 via the adhesive layer 742. Also, the indention region 746 ensures the indicium 714 is not disturbed by the tapered region 744 of the substrate 704. Further, the darkened region 748 disguises the surface 728 of the relief section 724 (depicted in FIG. 15) as well as a portion of the indention region 746. In this manner, a user viewing the indicium 714 may not be able to view the surface 728 through the gap 736.

The indicium support 718 of the substrate 704 is generally flat. That is, the indicium support 718 is generally parallel to the exterior region 706 of the substrate 704. This ensures the indicium, when secured with the indicium support, is also flat. In order to ensure the indicium support is flat, the cutting tool (for example, the second cutting tool 770 shown in FIG. 12) may include certain cutting techniques.

In order to select the indicium 714 for the indicium support 718, the area of the blind hole may be measure subsequent to the cutting techniques previously described. Then, the indicium 714 may be an indicium selected from one or more bins, with each bin having multiple indicia sorted by size. For example, the bins may include a first bin may include an indicia of a first size and a second bin including indicia of a second size different from the first size. An indicium may be selected from the first bin or the second bin based upon the area of the blind hole. The selected indicium may include a size that not only provides minimizes a gap between the indicium and the blind hole, but also a consistent gap size between the indicium and the blind hole.

Some of the various features shown and described in FIGS. 13-17 may also be incorporated in the embodiment shown in FIGS. 9 and 10. For example, in some embodiments, the substrate 604 shown in FIGS. 9 and 10 includes a tapered region 744, an indention region 746, and/or a darkened region 748.

Figure 17:
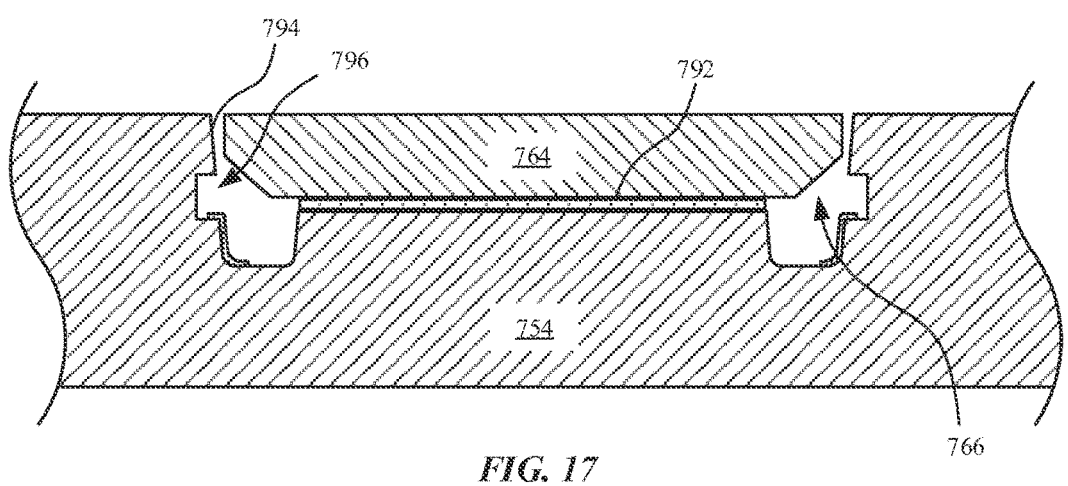
FIG. 17 illustrates a cross sectional view of a substrate having an alternate embodiment of an indicium with a chamfered region, in accordance with the described embodiments.

FIG. 17 illustrates a cross sectional view of a substrate 754 having an alternate embodiment of an indicium 764 with a chamfered region 766, in accordance with the described embodiments. As shown, the indicium 764 may be adhesively secured (via an adhesive layer 792) to the substrate 754 in a manner previously described. The chamfered region 766 provides additional clearance between the indicium 764 and the tapered region 794 of the substrate 754, thereby improving the likelihood of the indicium 764 positioned in a desired manner. Although an indention region 796 is shown, in other embodiments, the indention region 796 is removed as the chamfered region 766 provides sufficient clearance between structures. Accordingly, the chamfered region 766 may reduce the required number of manufacturing steps performed on the substrate 754. Also, the chamfered region 766 may be incorporated in previously described embodiments of an indicium.

FIGS. 18-25 illustrate a processing for cutting a substrate 804 in a manner that defines an indicium support 818, in accordance with the described embodiments. The cutting process designed herein may be prevent unwanted characteristics, such as warping of the indicium support 818. FIG. 18 illustrates a cross sectional view of an embodiment of a substrate 804 having an indicium support 818 having undergone an initial material removal process, in accordance with the described embodiments. The initial material removal process of the indicium support 818 is intended to be a "rough" cut, and is designed to remove only a portion of the substrate 804. A subsequent material removal process to the indicium support 818 increases the depth of the indicium support 818 respect to the exterior region 806 of the substrate 804. When an indicium and securing means (e.g., adhesive, weld, solder) are applied to the indicium support 818, the indicium is approximately co-planar, or flush, with respect to the exterior region 806 of the substrate 804.

FIG. 19 illustrates plan view of the indicium support 818 shown in FIG. 18 after the initial material removal process. The indicium support 818 includes a relatively flat surface designed to receive an indicium. In order to achieve a desired co-planarity, which in some cases is approximately 10 micrometers across the surface of the indicium support 818, additional cutting techniques described below may be used.

FIG. 20 illustrates a cross sectional view of the substrate 804 shown in FIG. 18, with the indicium support 818 undergoing the subsequent material removal process. During the subsequent material removal process, a cutting tool 870 (e.g., CNC cutting tool) traverses along a surface of the indicium support 818. For example, as shown in FIG. 18, the cutting tool 870 may begin by cutting an outer region 824 of the indicium support 818 to define a circular cutting path that ends in a central region 822 of the indicium support 818.

FIG. 21 illustrates plan view of the indicium support 818 shown in FIG. 20. In some embodiments, the cutting pattern is a linear path (e.g., raster path). In other embodiments, the cutting path is a circular path beginning at a central region 822 of the indicium support 818 and ending at an outer region 824 of the indicium support 818. Still, in other embodiments, the cutting path is a "zig zag" path along the indicium support 818. In the embodiment shown in FIG. 19, the cutting path is a circular path beginning along the outer region 824 and traversing in a direction toward the central region 822.

Figure 23:
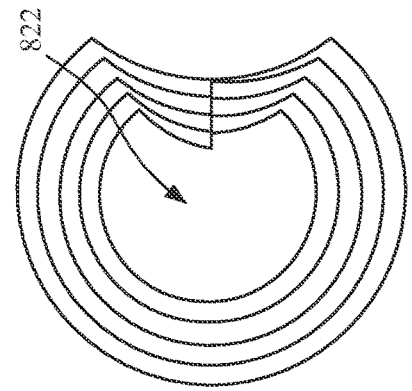
FIG. 23 illustrates plan view of the indicium support shown in FIG. 22.
Figure 22:
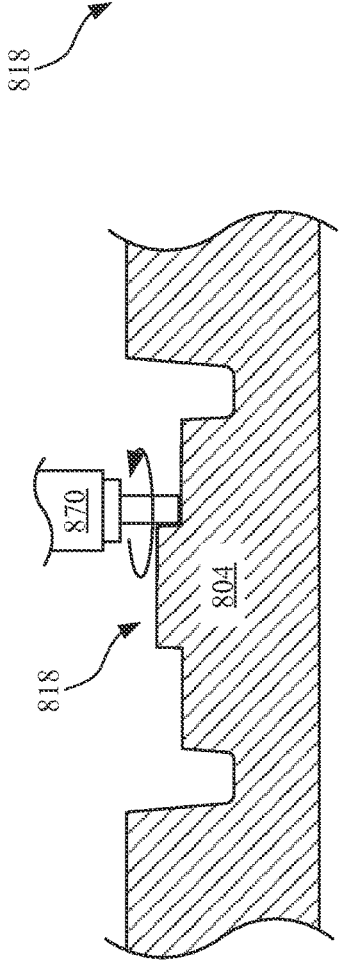
FIG. 22 illustrates a cross sectional view of the substrate shown in FIG. 20, with the indicium support further undergoing the subsequent material removal process.

FIG. 22 illustrates a cross sectional view of the substrate 804 shown in FIG. 20, with the indicium support 818 further undergoing the subsequent material removal process. FIG. 23 illustrates plan view of the indicium support 818 shown in FIG. 22. FIGS. 22 and 23 show the cutting tool 870 removing additional material from the indicium support 818 as the cutting tool 870 continues traversing in a direction toward the central region 822.

Figure 24:
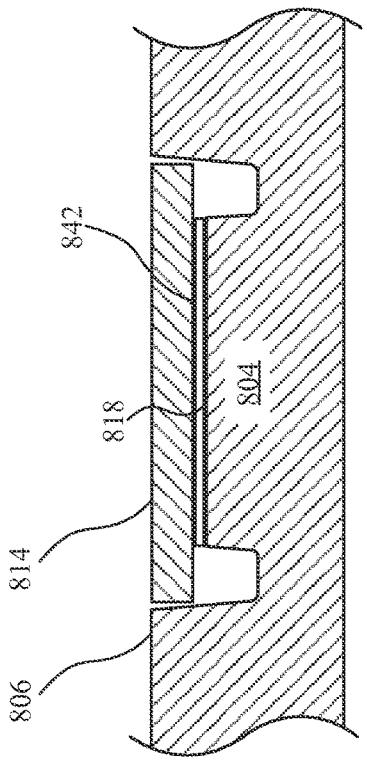
FIG. 24 illustrates a cross sectional view of the substrate shown in FIG. 22, with the indicium support further undergoing the subsequent material removal process such that the indicium support reaches its final shape.

FIG. 24 illustrates a cross sectional view of the substrate shown in FIG. 22, with the indicium support 818 further undergoing the subsequent material removal process such that the indicium support 818 reaches its final shape. The indicium support 818 is now sub-flush with respect to the exterior region 806 at a depth such that an indicium 814, secured with the indicium support 818 via an adhesive layer 842, is co-planar with respect to the exterior region 806. The cutting pattern used form the subsequent material removal process of the indicium support 818 can form an indicium support 818 having a flatness of 15 micrometers. In other words, the variation from one edge of the indicium support 818 to another edge of the indicium support 818 may vary in elevation or topography by 15 micrometers or less. In this manner, an indicium 814 secured with the indicium support 818 also appears relatively flat. It will be appreciated that features shown in other embodiments—such as a laser-ablated profile, an indention feature, and/or a darkened region—may also be performed to the substrate 804 prior to securing the indicium 814 with the substrate 804.

Figure 25:
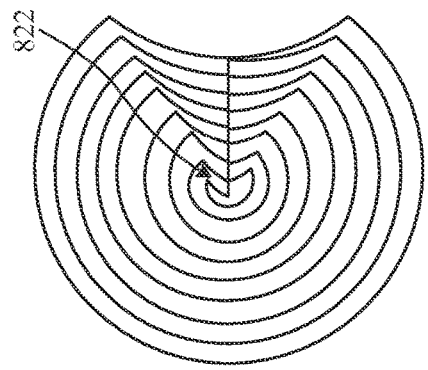
FIG. 25 illustrates plan view of the indicium support shown in FIG. 23.

FIG. 25 illustrates plan view of the indicium support 818 shown in FIG. 24. For purposes of illustration, the indicium 814 (shown in FIG. 24) is removed to show a surface of the indicium support 818. As shown, the cutting pattern is complete when the cutting tool (not shown) reaches the central region 822. This allows the indicium support 818 to include a desired co-planarity of the surface of indicium support 818.

Figure 26:
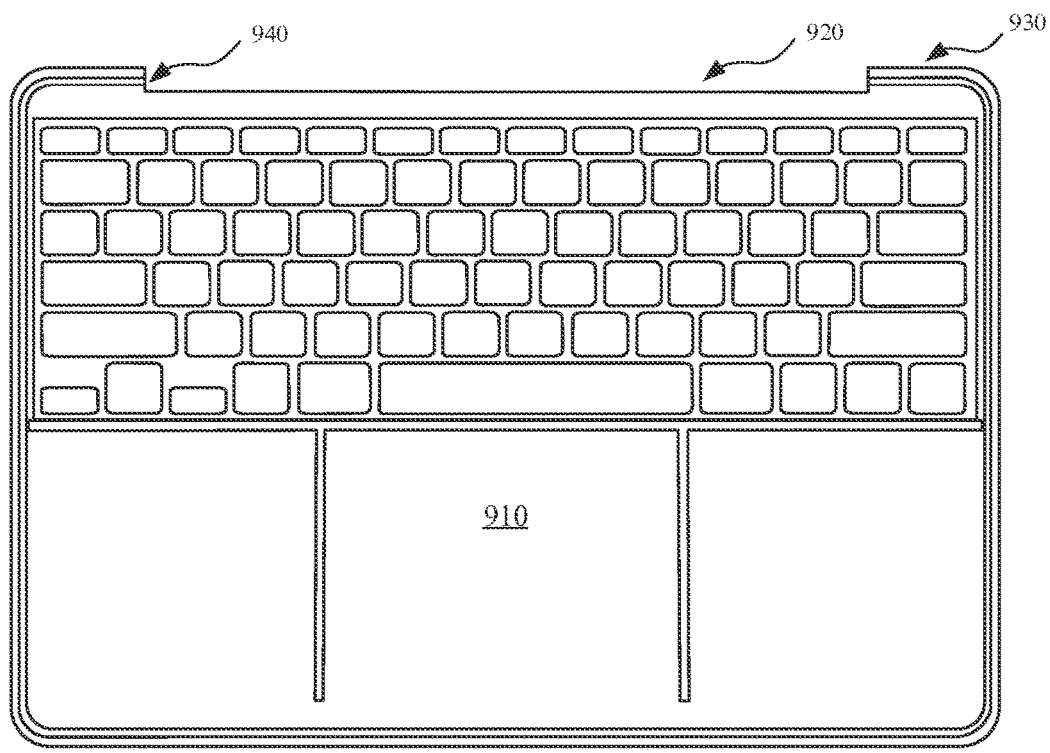
FIG. 26 illustrates a plan view of an interior portion of a top case of a portable computing device having undergone a material removal process, in accordance with the described embodiments.

The laser ablation process used to form a profile in a substrate may be used in other applications on a portable computing device. For example, FIG. 26 illustrates a plan view of an interior portion 920 of a top case 910 of a portable computing device (e.g., portable computing device 200 shown in FIG. 3) having undergone a material removal process, in accordance with the described embodiments. As shown, the top case 910 includes an outer peripheral region 930. Within the outer peripheral region 930, the top case 910 further includes an ablation region 940 defined by a material removal process from a laser ablation tool previously described. The ablation region 940 extends around the top case 910 adjacent to, and within, the outer peripheral region 930. The ablation region 940 may be designed to receive a bottom case (not shown) such that the top case 910 and the bottom case combine to receive some internal components of the portable computing device.

Figure 27:
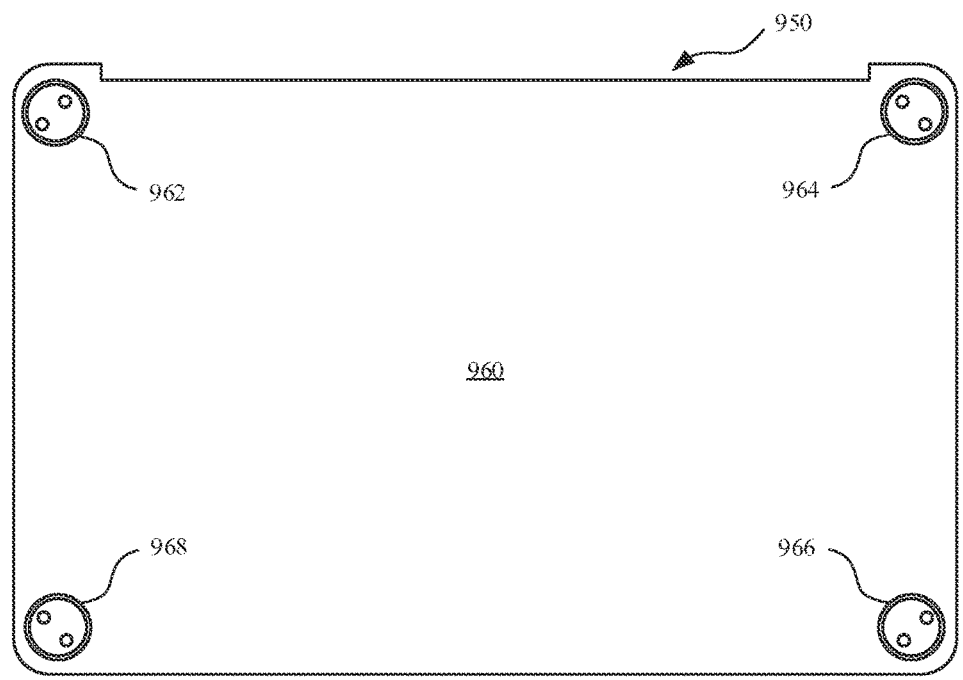
FIG. 27 illustrates a plan view of an exterior region of a bottom case of a portable computing device having undergone a material removal process, in accordance with the described embodiments.

FIG. 27 illustrates a plan view of an exterior region 950 of a bottom case 960 of a portable computing device having undergone a material removal process, in accordance with the described embodiment. As shown, the bottom case 960 may include a first foot receiving region 962, a second foot receiving region 964, a third foot receiving region 966, and a fourth foot receiving region 968. Each of these foot receiving regions may be designed to receive, for example, an injection-molded structure defining a foot designed to engage a surface on which a portable computing device lies. Also, the outer region of each of these foot receive regions may be formed by a laser ablation process previously described. Also, the bottom case 960 may be secured with the top case 910 (shown in FIG. 26).

Figure 28:
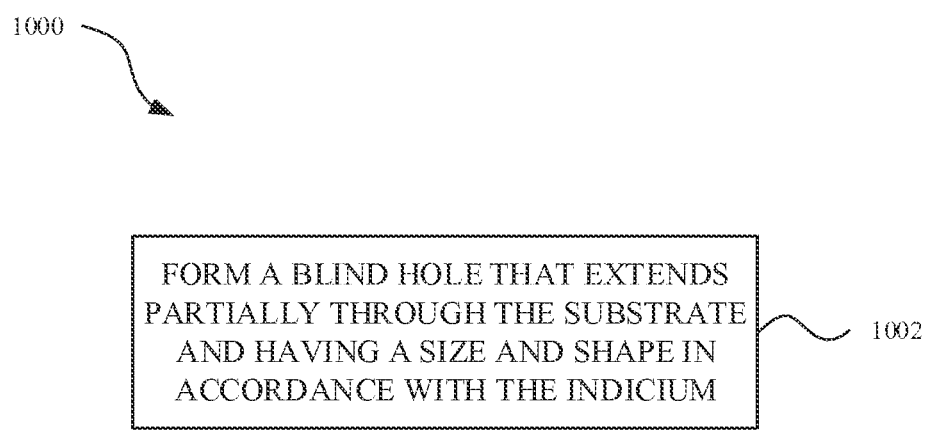
FIG. 28 illustrates a flow chart showing a method for forming an enclosure of a portable computing device, in accordance with the described embodiments.

FIG. 28 illustrates a flowchart 1000 showing a method for forming an enclosure of a portable computing device, in accordance with the described embodiments. In step 1002, a blind hole is formed that extends partially through the substrate. The blind may include a size and shape in accordance with the indicium. For example, the blind hole may include one or more edge features such that the blind hole includes a profile similar to that of the indicium. Also, the blind hole may be formed by removing a first amount of the substrate to a first depth and by removing a second amount of the substrate to form a relief section to a second depth greater than the first depth. The removal means may include a cutting tool, such as a CNC tool, as well as an ablation tool, such as a laser ablation tool. Also, in some embodiments, a size and shape of the relief section defines an indicium support configured to receive the indicium. The relief section may be disposed at a depth different than that of the indicium support. For example, the relief section may be disposed at a depth greater than that of the indicium support, with the depth measured from an exterior region or surface of the substrate.

The indicia (multiple indicium) described in this detailed description may be formed in different sizes and/or different thicknesses within a specified tolerance. Then, the indicia may be separated into different bins according to their size and/or thickness. Once the material removal processes previously described are performed on a substrate, a vision system may inspect the substrate, and in particular, features such as the blind hole and the indicium support. The vision system may input the inspection to controller. Based upon the size and shape of the blind hole and/or indicium support, the controller determine from which bin an indicium will be selected, and directs a robotic arm to select an indicium from the selected bin. This process allows for a best fit between an indicium and a substrate, which corresponds to a portable computing device having a more consistent appearance.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An enclosure of a portable computing device, comprising:
    a substrate including an exterior region and an opening extending partially through the substrate to define a blind hole;
    an indicium support disposed in the blind hole at a first depth measured from the exterior region to a top surface of the indicium support;
    a relief section in the blind hole, the relief section extending around the indicium support and disposed at a second depth measured from the exterior region to a surface of the relief section, the second depth greater than the first depth; and
    an indicium received within the blind hole and overlapping the relief section to define an air gap below the indicium.

2. The enclosure of claim 1, wherein the indicium is adhesively secured with the indicium support.

3. The enclosure of claim 1, wherein the indicium support includes a size and a shape such that the indicium is co-planar with respect to the exterior region of the substrate.

4. The enclosure of claim 1, wherein:
    the blind hole is at least partially defined by a sidewall extending from the exterior region to the surface of the relief section and having an indention region formed therein.

5. The enclosure of claim 4, wherein the relief section includes a darkened region on the surface of the relief section, wherein the darkened region extends partially into the indention region.

6. The enclosure of claim 1, wherein the substrate comprises a tapered region.

7. A method for incorporating an indicium within a substrate used for an enclosure of a portable computing device, the method comprising:
    forming a blind hole that extends partially through the substrate and having a size and shape in accordance with the indicium, the blind hole formed by removing a first amount of the substrate to a first depth and by removing a second amount of the substrate to form a relief section to a second depth greater than the first depth, wherein:
    the relief section defines an indicium support configured to support the indicium; and
    a portion of the indicium overlaps the relief section to define an air filled space between the portion of the indicium and the relief section.

8. The method of claim 7, further comprising means for forming a darkened region in the relief section such that the relief section includes an appearance darker than an appearance of the substrate.

9. The method of claim 8, further comprising adhesively securing the indicium to the indicium support.

10. The method of claim 8, wherein the means for forming the darkened region is selected from a group consisting of burning a surface of the relief section, applying an ink to the surface of the relief section, and applying a paint to the surface of the relief section.

11. The method of claim 9, wherein when the indicium is adhesively secured with the indicium support, the first depth allows the indicium received by the indicium support to be co-planar with respect to an exterior region of the substrate.

12. The method of claim 7, further comprising forming an indention region in the blind hole proximate to the relief section.

13. The method of claim 7, wherein forming the blind hole comprises cutting the substrate along the indicium support in a circular path from an outer region of the indicium support to a central region of the indicium support.

14. A housing for carrying an operational component of a portable computing device, the housing comprising:
   an exterior region having a surface;
   a recessed portion that extends partially through the housing, the recessed portion comprising a terminus surface and a wall extending from the terminus surface and into a cavity defined by the recessed portion, the wall defining a size and shape of a support structure, the wall further comprising an edge that defines a size and shape of a support surface of the support structure such that the support surface is approximately parallel to the surface of the exterior region; and
   a generally flat object positioned in the recessed portion and supported by the support structure such that a portion of the object extends beyond the edge to define an air clap between a bottom surface of the object and the recessed portion.

15. The housing of claim 14, wherein the wall and the terminus surface define a relief section that assures that a viewable surface of the object secured to the support structure at the support surface is generally co-planar with the exterior region.

16. The housing of claim 15, wherein when a lateral dimension of the object is greater than that of the support structure, the relief section allows the portion of the object to extend past the support structure without interference thereby (i) maintaining co-planarity of the object with respect to the support surface and (ii) maintaining the viewable surface of the object parallel with the exterior region.

17. The housing of claim 14, wherein the support surface is formed using an additive manufacturing process by depositing material at the terminus surface or formed by attaching a pre-formed support structure at the terminus surface.

18. The housing of claim 14, further comprising a second wall extending from the terminus surface having a corresponding edge that defines a boundary between the exterior region and the recessed portion.

19. The housing of claim 18, wherein a contour of the object defines a size and shape of the corresponding edge.

20. The housing of claim 14, wherein an exterior surface of the generally flat object is substantially coplanar with the surface of the exterior region.

* * * * *